(No Model.)  5 Sheets—Sheet 1.
N. A. OTTO.
Gas Motor Engine.
No. 241,707.  Patented May 17, 1881.
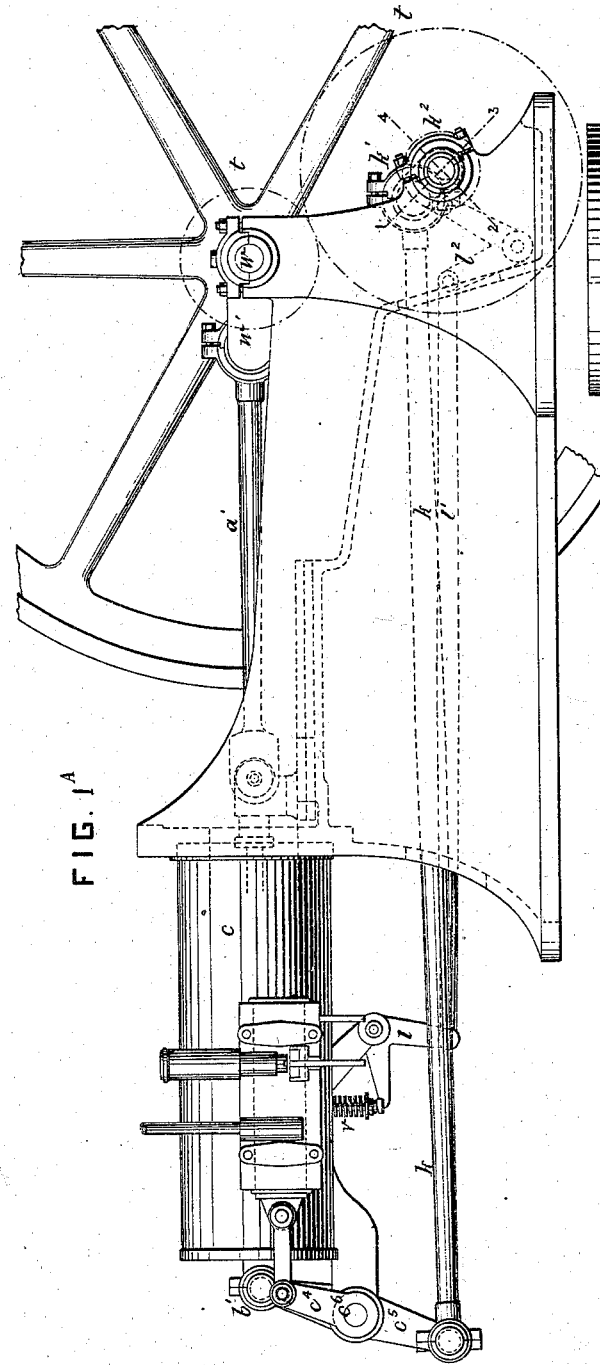
FIG. 1$^A$
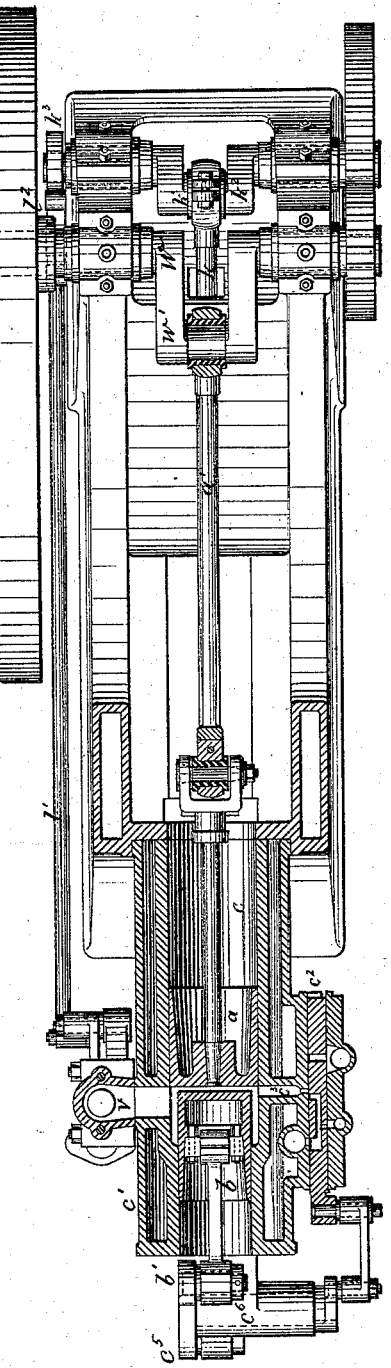
FIG. 1$^B$
Witnesses.
J. A. Rutherford
Robert Everett
Inventor.
N. A. Otto.
By James L. Norris.
Atty.

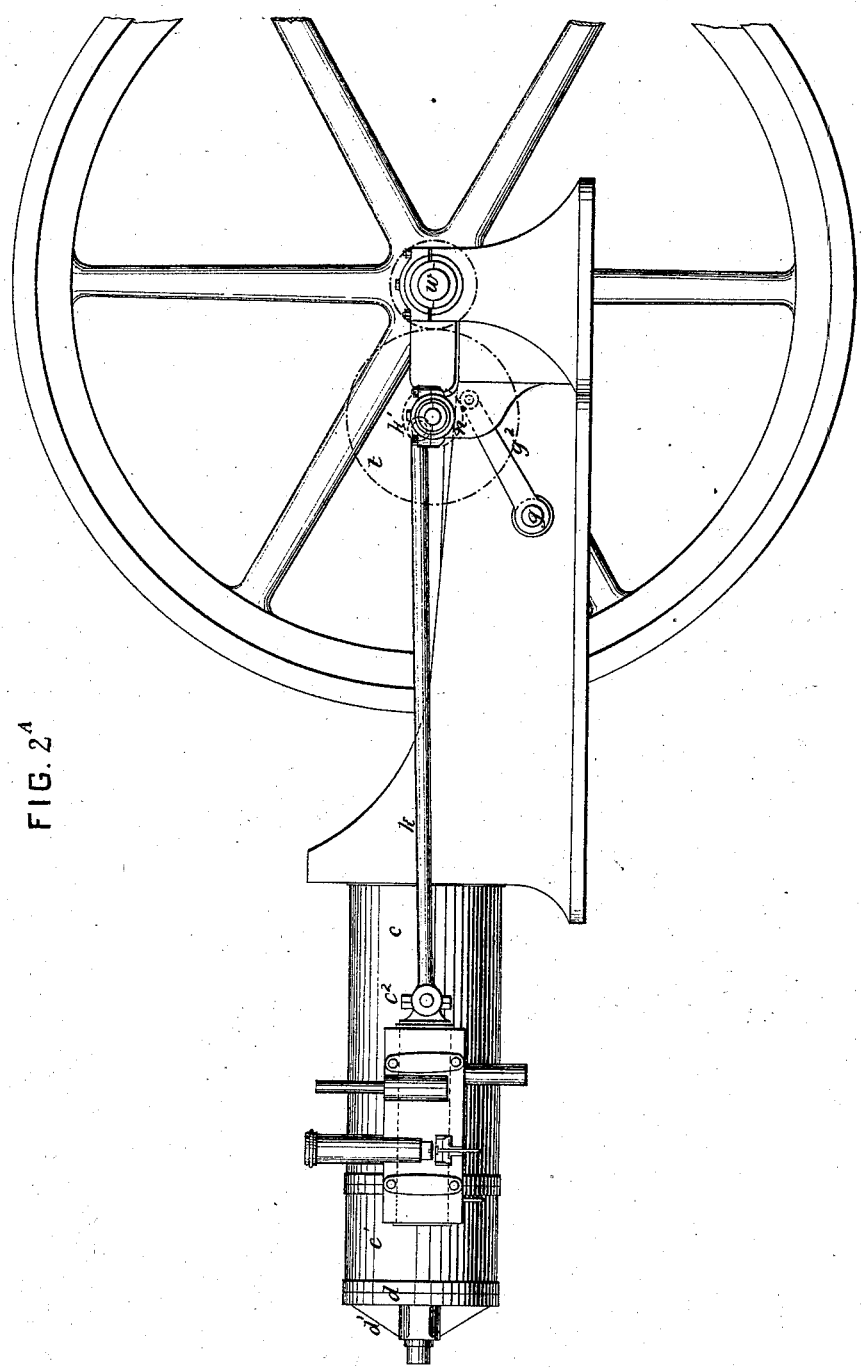

(No Model.)
N. A. OTTO.
Gas Motor Engine.
No. 241,707. Patented May 17, 1881.
5 Sheets—Sheet 3.
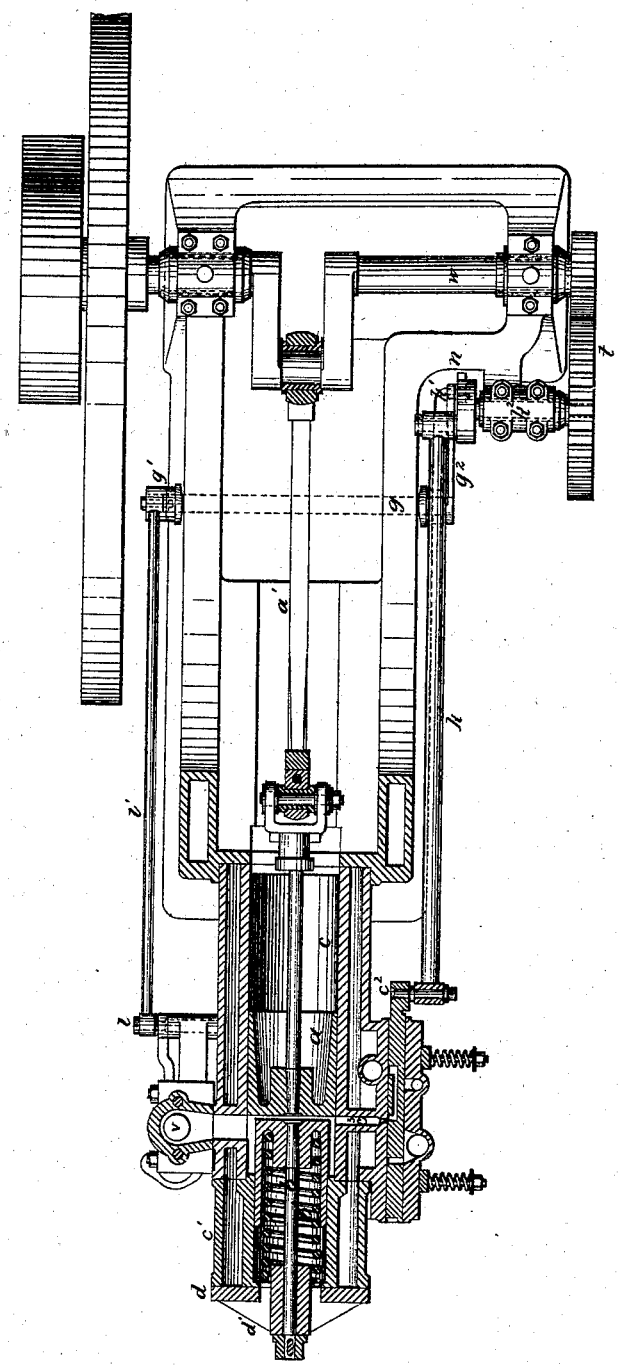
FIG. 2ᴮ
Witnesses:
J. A. Rutherford
Robert Everett
Inventor:
N. A. Otto.
By James L. Norris.
Atty.

(No Model.) 5 Sheets—Sheet 4.
N. A. OTTO.
Gas Motor Engine.
No. 241,707. Patented May 17, 1881.
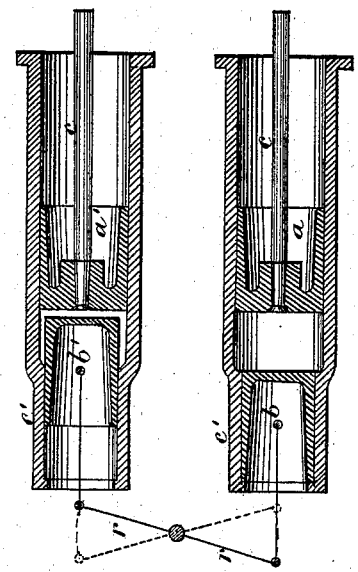
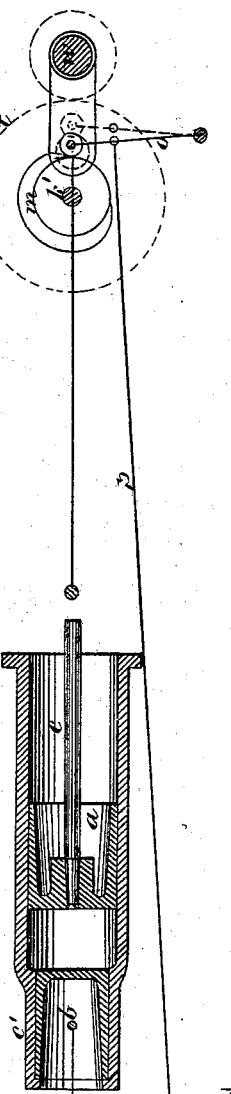
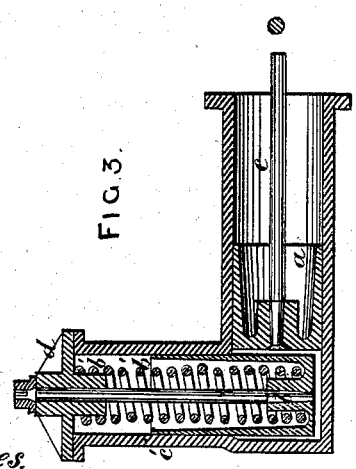
Witnesses.
J. A. Rutherford
Robert Barrett
Inventor
N. A. Otto
By James L. Norris.
Atty.

(No Model.) 5 Sheets—Sheet 5.
N. A. OTTO.
Gas Motor Engine.
No. 241,707. Patented May 17, 1881.
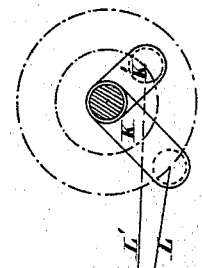
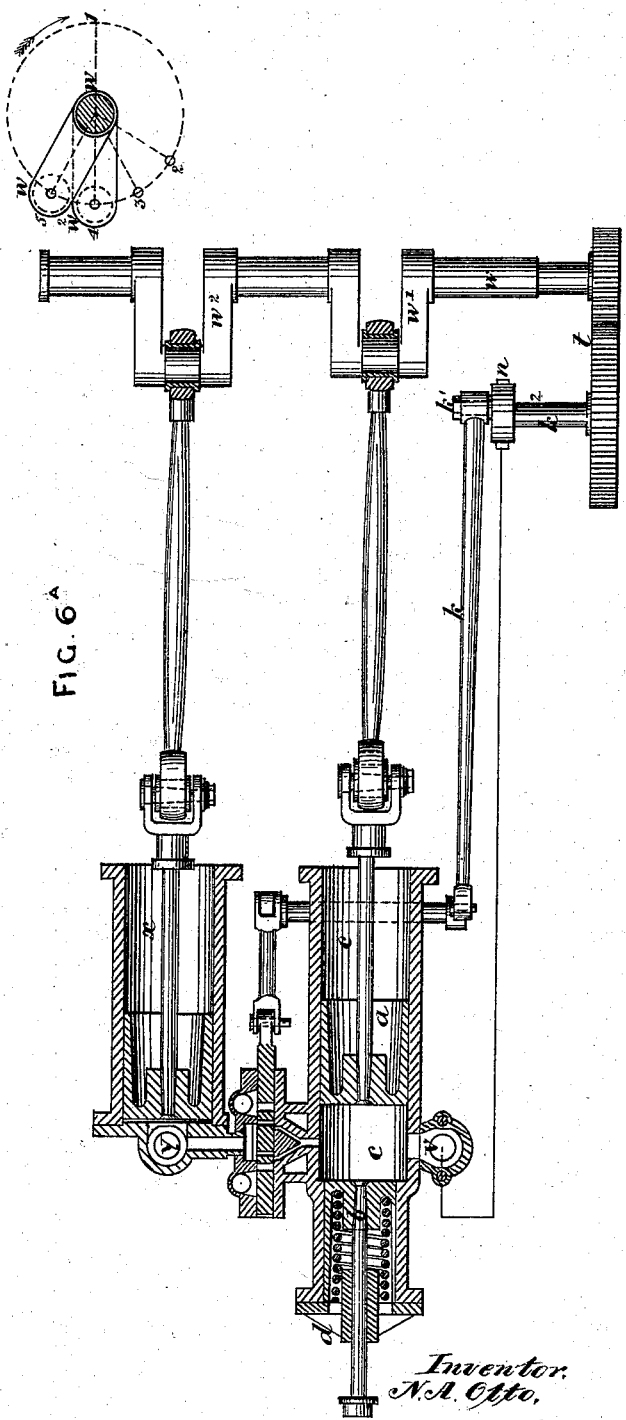
Witnesses:
J. A. Rutherford
Robert Bouett
Inventor:
N. A. Otto,
By James L. Norris
Atty.
N. PETERS, Photo-Lithographer, Washington, D. C.

United States Patent Office.

NICOLAUS A. OTTO, OF DEUTZ-ON-THE-RHINE, GERMANY.

GAS-MOTOR ENGINE.

SPECIFICATION forming part of Letters Patent No. 241,707, dated May 17, 1881.

Application filed March 28, 1881. (No model.) Patented in England January 5, 1881.

*To all whom it may concern:*

Be it known that I, NICOLAUS AUGUST OTTO, a citizen of Prussia, residing at Deutz-on-the-Rhine, in the German Empire, have invented a new and useful Improvement in Gas-Motor Engines, (for which a patent in Great Britain has been obtained by Charles Denton Abel, as a communication to him from abroad by me, bearing date 5th January, 1881, No. 60,) of which the following is a specification.

In gas-motor engines it is found to be very advantageous to ignite the combustible gaseous charge while the piston is still at the dead-center before commencing the working stroke, or when it has only moved slightly from that position.

In the construction of the gas-motor engine now generally known as the "Otto Silent Engine," and described in the specification to former Letters Patent granted to me, a space was provided in the cylinder beyond the piston when at the end of its instroke for containing the combustible charge, whereby the engine was enabled to be worked in the manner above mentioned, and the space thus formed remained charged with air or products of combustion after the piston had performed its return-stroke after the working outstroke. According to the present improvements, the said space is still retained at the end of the cylinder; but the products of combustion are removed therefrom at the end of each return-stroke of the piston after the working outstroke by means of an auxiliary piston so arranged that when the working-piston performs its instroke the auxiliary piston advances into the said space, so as to expel its contents, while, when the combustible charge is drawn in and is being compressed, the said space is left free by the auxiliary piston.

According to another feature described in the before-mentioned previous patents, the combustible charge for the engine was so formed that while a portion of the charge at the point of ignition consisted of undiluted explosive mixture, which rendered ignition certain, the other portion of the charge consisted of combustible gas more or less diluted with or dispersed among non-combustible or inert gases, whereby the combustion of the charge, and consequent expansion of the gases, was made to take place gradually. This mode of forming the combustible charge is also applicable with the above-described modes of operating by causing air alone to be drawn in at the commencement, and afterward a combustible mixture of gas and air.

The accompanying drawings show various arrangements for causing gas-engines to operate according to the above-described method.

Figure 1$^A$ shows a side elevation, and Fig. 1$^B$ a plan, of one arrangement.

$c$ is the engine-cylinder, whose piston $a$ is connected, by a cross-head running in guides and connecting-rod $a'$, to the crank-shaft $w$, provided with a fly-wheel.

$c^3$ is the inlet-port for the combustible charge of gas and air, the admission of which is regulated by the slide $c^2$, connected by levers $c^4$ $c^5$ on shaft $c^6$, and by rod $k$ to crank $k'$ on shaft $k^2$, driven by gearing $t$ from shaft $w$, the gearing being so proportioned that the crank $k'$ makes one revolution for every two revolutions of $w$, so that the slide $c^2$ makes one to-and-fro movement while the piston $a$ makes two in and two out strokes. By this means the piston $a$ is during its first outstroke made to draw in the combustible charge of gas and air, which charge it compresses by the following instroke, after which the charge is ignited, causing the piston to perform its working outstroke, and on the following instroke the gaseous products of combustion are expelled through the outlet-valve $v$, the opening of which at every alternate instroke is effected by a bell-crank lever, $l$, connected by rod $l'$ to a lever, $l^2$, with a roller in gear with a cam, $k^3$, on shaft $k^2$.

The construction of the engine and its mode of operating are so far similar to that described in my previous patents, dated 30th May, 1876, and 14th August, 1877, and the action of the slide and other parts need not be further referred to.

The cylinder $c$ has an extension, $c'$, in which is an auxiliary piston, $b$, whose rod is connected to a lever, $b'$, on the shaft $c^6$, so that the piston receives an in-and-out motion by means of the crank $k'$ and rod $k$.

The position of the parts shown on the drawings is assumed to be that in which the piston $a$, being at the end of its instroke and on the dead-center, is about to perform its outstroke to draw in the combustible charge of gas and air through the port $c^3$, the slide $c^2$ being moved so as first to admit air alone and then a mixture of gas and air.

It will be seen that the crank $k'$ is so placed relatively to the crank $w'$ of the engine-piston $a$ that while the latter is performing this suction outstroke the crank $k'$ will move from the position 1 into the position 2, and consequently the displacing-piston $b$ will during such stroke have a small in-and-out movement imparted to it, so that at the end of such outstroke of $a$ it will again occupy the position shown. On the piston $a$ now performing its compressing instroke the crank $k'$ will move from point 2 to point 3, thereby withdrawing the piston $b$ into the cylinder-extension $c'$, so as to leave room behind the piston $a$ for containing the compressed charge when the latter again arrives in the position shown on the drawings. The charge being now fired, the piston $a$ performs its working outstroke, during which time $k'$ moves from 3 to 4, so that piston $b$ again makes a slight in-and-out movement in its backward position. On the piston $a$ performing its return-stroke for expelling the gaseous products, (the valve $v$ being opened during that time by the cam $k^3$,) the crank $k'$ moves from 4 to 1 again, whereby piston $b$ is protruded into the cylinder again, so as to arrive at the position shown close up to the piston $a$ when this arrives at the end of its instroke, and thus it will be seen that practically the whole of the products of combustion will be expelled. The above-described cycle of movements will then be repeated.

Figs. $2^A$ and $2^B$ show respectively a side elevation and sectional plan of another arrangement, in which the displacing-piston $b$, instead of receiving a positive motion, as in the former case, is actuated by a spring, $b'$, as follows: The piston-rod of $b$ passes through the guide $d'$ of the cover $d$ to the extension $c'$, and at its outer end it has a collar, which prevents it from being protruded beyond the position shown on the drawings, into which position the spring $b'$ tends to move it. Assuming the position of the engine to be the same as that described with reference to the previous arrangement—that is, the piston $a$ being about to perform its suction outstroke—then on the following compressing instroke, when the piston $a$ will have arrived at a point where the pressure of the compressed gases overbalances the pressure of spring $b'$, the piston $b$ will be forced back into the extension $c'$, so that by the time piston $a$ again arrives in the position shown there will exist between it and piston $b$ a space in which will be contained the compressed charge. This being now fired, piston $a$ performs its working outstroke, piston $b$ being kept in its backward position by the pressure of the heated expanding gases. Upon the opening of the escape-valve $v$ during the return-stroke of piston $a$ the pressure, in sinking below that of the spring $b'$, will allow piston $b$ to be forced forward again into the position shown, so that when piston $a$ again arrives at the end of its instroke the whole of the gases will have been expelled, as in the former arrangement.

In the modified arrangement shown in the section of the working-cylinder at Fig. 3, the auxiliary piston $b$ and the cylindrical extension $c'$ are arranged at right angles to the cylinder $c$, either vertically or horizontally, instead of in line therewith, the pressure of the compressed charge in acting on the under face of the piston $b$ forcing it inward against the action of the spring $b'$, as before.

The end of the cylinder $c'$ may be closed air-tight, so that the imprisoned air behind the piston, in being compressed, will assist the action of the spring, and if the extension $c'$ be vertical or inclined at any angle, the weight of the piston $b$ will also be brought in aid of the spring.

It will be evident that in both the above-described arrangements the auxiliary piston might be urged by a weight instead of a spring.

In the arrangement shown diagrammatically at Fig. 4 the auxiliary piston $b$ is connected by a lever, $q$, and rod $p$ to a lever, $o$, bearing with a roller against a cam, $m$, on shaft $k'$, which is driven by gearing $t$ from crank-shaft $w$, so as to revolve at half the speed of the latter. By this arrangement the piston $b$ is forced back in chamber $c'$ during the compression of the charge in the cylinder, while during the second return-stroke, when the products of combustion are expelled, the cam $m$ moves the levers $o$ and $q$ into the positions shown in dotted lines, whereby the piston $b$ is made to advance toward piston $a$, so as to expel the whole of the products of combustion, as before described.

Fig. 5 shows the invention applied to a double-cylinder engine, the pistons $a\ a'$ being made to perform their in and out strokes simultaneously; but while the one is performing its compressing instroke the other is making its expelling instroke. The two auxiliary pistons $b\ b'$ are connected to a sway-beam, $r$, so that as $b$ is being forced back during the compressing stroke of piston $a$ it causes $b'$ to be forced forward while piston $a'$ is expelling the gases, and conversely.

Figs. $6^A$ and $6^B$ show the invention as applied to a gas-motor engine in which the combustible charge is compressed by a separate pump before entering the engine-cylinder, so that every stroke of the piston of the latter is a working stroke. Fig. $6^A$ shows a sectional plan, and Fig. $6^B$ a diagram of the crank motions.

$x$ is the compressing-pump, having at $y$ inlet and delivery valves, arranged one above the other in any suitable known manner. The cranks $w'\ w^2$, respectively, of the engine-cylinder and the pump being situated at an angle, 4 5, to each other, as shown at Fig. $6^B$, the action of the two cylinders is as follows: The compressing-pump draws in a combustible charge during the half-revolution from 4 to 1, Fig. $6^B$, and compresses during the part 1 to 2 of the other half-revolution, while during the remaining portion, from 2 to 4, the piston forces the compressed charge into cylinder $c$ through the slide $s$, which is made for this purpose to open when $w'$ is at the point 2. On entering the cylinder $c$ the compressed charge forces back the auxiliary piston $b$ against the action of the spring $b'$, so as to make room for the charge behind the piston $a$, which at the time when the compressing-pump is at end of instroke is just past its end instroke, $w'$ being at point 5, it having moved from 4 to 5 while the pump-crank $w^2$ moved from 3 to 4. At this point the slide effects the ignition of the charge, this being the condition of the engine shown on the drawings. The piston $a$ is then caused to perform its working stroke from 5 to 1 by the expansion of the heated gases, whereupon the escape-valve $v$ is opened by the action of cam $n$ and the products of combustion escape while the piston is moving from 1 to 3. As the pressure in the cylinder decreases during this time, the piston $b$ is moved forward by its spring so as to meet the piston $a$ at point 3, and thus effect the expulsion of the whole of the products of combustion. At this point the escape-valve closes, and the pump-piston being at point 2 while the slide is opening the inlet-port to cylinder $c$, a fresh compressed charge is introduced and the above-described cycle of movements is repeated. The shaft $k^2$ being made by the gearing $t$ to revolve with half the speed of the engine-shaft, the slide $s$ also makes a single stroke for every double stroke of the pistons, the ports and gas-passages being in duplicate, as shown, so that the admission and ignition of the charge will be effected during both the in and the out stroke of the slide. The cam $n$ is also made double, so as to effect the opening of the escape-valve $v$ at each semi-revolution.

Fig. 7 shows an arrangement where the charge is also compressed by a separate pump, (not shown on the drawings,) or in which the charge is admitted and fired at atmospheric pressure. In this case both the pistons $a$ and $b$ are connected to the crank-shaft, $a$ being connected by rod $L$ to crank $K$, and $b$ by rod $L'$ and lever $L^2$ to the smaller crank $K'$. The cranks are at such an angle that during one part of each revolution they cause the pistons to approach each other, and during another part to recede from each other. The inward movement of the piston $b$ is made to take place while the piston $a$ is performing its instroke, expelling the products of combustion, while during the first part of the outward movement of $b$ the charge is drawn in, and during the last part this piston is acted upon by the expanding gases in a similar manner to piston $a$.

Having thus described the nature of my invention and in what manner the same is to be performed, I wish it to be understood that I am aware that gas-motor engines have been constructed with two working-pistons connected to opposite cranks, so that they are propelled in opposite directions by the combustible charge; also, that gas-motor engines have had auxiliary pistons serving to draw in the combustible charge, and to be propelled thereby in the same direction as the engine-piston upon firing, such an arrangement having been patented in England by Brooman, as a communication from me, on the 24th August, 1863, and I do not claim such arrangements as my present invention.

I am also aware that gas engines have been provided with two pistons propelled in opposite directions by the pressure produced by the ignition of an explosive gaseous mixture, in order that one of said pistons may be propelled without doing work, so that by the expansion and cooling of the products of combustion a partial vacuum is created in the cylinder, thereby causing the working-piston to be propelled by atmospheric pressure; but such do not constitute my invention, and are not claimed by me.

What I claim as my invention is—

1. In a gas-motor engine, the combination, with a cylinder provided at one end with a space extended beyond the main piston at the limit of its instroke, and adapted to receive the combustible charge, of an auxiliary piston arranged to advance into said space in rear of the main piston, and acting to expel the products of combustion from said space at the instroke of the main piston, and to recede from said space to free it for the admission of the subsequent combustible charge at the outstroke of the main piston, substantially as described.

2. In a gas-motor engine, the combination of the cylinder provided at one end with a space extended beyond the main piston at the limit of its instroke, and adapted to receive the combustible charge, and an independent auxiliary piston connected by intermediate mechanism with the crank of the main piston, and arranged to advance into the said space in rear of the main piston, to expel the products of combustion from said space at the instroke of the main piston, and to recede from said space at the outstroke of the main piston, to free the space for the admission of the subsequent combustible charge, substantially as described.

3. The combination of pistons $a$ and $b$, cylinder $c\ c'$, crank-shaft $w$, and counter-shaft $k$, driven by gearing $t$ and having a crank, $k'$, operating piston $b$, substantially as and for the purposes set forth.

In testimony whereof I have signed my name to this specification, in the presence of two subscribing witnesses, this 9th day of March, A. D. 1881.

NICOLAUS AUGUST OTTO.

Witnesses:
GUSTAV KLEINJUNG,
EDUARD KIRSCHSIEPER.